(Model.)
A. GANDY & R. M. BLACK.
Hub for Vehicle Wheels.
No. 242,917. Patented June 14, 1881.
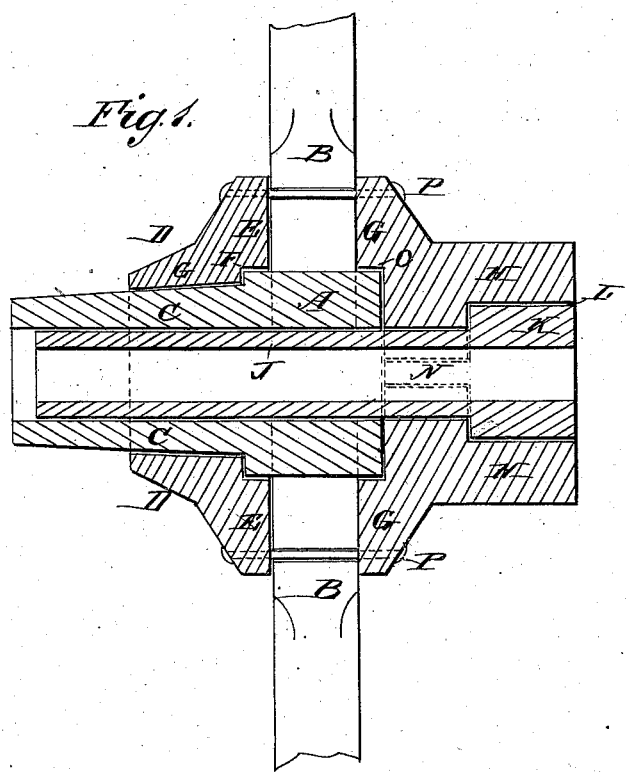
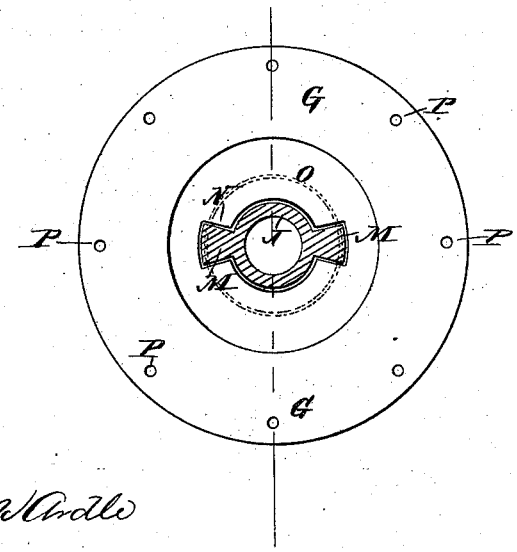
WITNESSES:
Francis McArdle
C. Sedgwick
INVENTOR:
A. Gandy
R. M. Black
BY Munn & Co
ATTORNEYS.

UNITED STATES PATENT OFFICE.

ALONZO GANDY AND RUSINUS M. BLACK, OF FREEPORT, OHIO.

HUB FOR VEHICLE-WHEELS.

SPECIFICATION forming part of Letters Patent No. 242,917, dated June 14, 1881.

Application filed March 10, 1881. (Model.)

*To all whom it may concern:*

Be it known that we, ALONZO GANDY and RUSINUS M. BLACK, of Freeport, Harrison county, Ohio, have invented a new and Improved Hub, of which the following is a specification.

The object of our invention is to provide a new and improved hub for wheels which will not shrink and warp, and which is very durable.

The invention consists in a hub constructed with a central ring of wood into which the inner ends of the spokes are mortised, and which is provided with a conical continuation or sleeve toward the outside of the wheel, upon which central ring of wood a flanged ring is placed at each side, which flanged rings are bolted or riveted together, so that the inner ends of the spokes will be held between the flanges. The axle-box passes through the central ring and the conical sleeve of the same, and is held in this hub by lugs fitting in grooves in the flanged rings.

In the accompanying drawings, Figure 1 is a longitudinal sectional elevation of my improved hub. Fig. 2 is an inner end elevation of the inner flanged plate of the wheel, showing the axle-box and its lugs in cross-section.

Similar letters of reference indicate corresponding parts.

A ring, A, which is slightly wider than the spokes B, forms the center of the hub, and the inner ends of the spokes are mortised into this ring. This ring A is provided with a hollow conical continuation or sleeve, C, extending in the direction toward the outside of the wheel. A ring, D, the inner surface of which is beveled, the same as the conical sleeve C, is provided with an annular flange, E. The inner surface of the flange E rests against the outer surface of the spokes B, and is provided with an annular recess, F, to receive the outer end of the ring. The flange G of the ring H is placed against that side of the spokes opposite that against which the flange E rests, and the flanges E G are united by eight rivets or bolts which pass through the joint of the lower end of two adjoining spokes, so that the inner ends of the spokes will be firmly held between the flanges E and G. The flange G of the ring H is provided with a circular or annular recess, O, to receive the inner end of the ring A, as is shown.

The axle-box J passes through the ring A and through the sleeve C, and is provided at the inner end with an enlarged part, K, fitting into a recess, L, in the end of the ring H. Two wedge-shaped ridges or feathers, M M, extend from the enlarged part K of the axle-box toward the front of the axle-box, and fit into corresponding grooves N in the inner surface of the ring H, and thereby hold the axle-box in the hub. The ring A and the sleeve C will be held firmly between the rings D H, and their flanges E G will hold the inner ends of the spokes. This hub cannot shrink and warp, and is very strong.

Having thus described our invention, we claim as new and desire to secure by Letters Patent—

A hub provided with a separate inner ring, A, mortised to receive the ends of spokes fitting on each side within annular recesses of the flanges E G, and having a single side extension, C, as shown and described.

ALONZO GANDY.
RUSINUS M. BLACK.

Witnesses:
SAML. C. KELLY,
JOSEPH ROMANS.